N. B. BRANDENBURG.
RAT TRAP.
APPLICATION FILED JAN. 7, 1920.

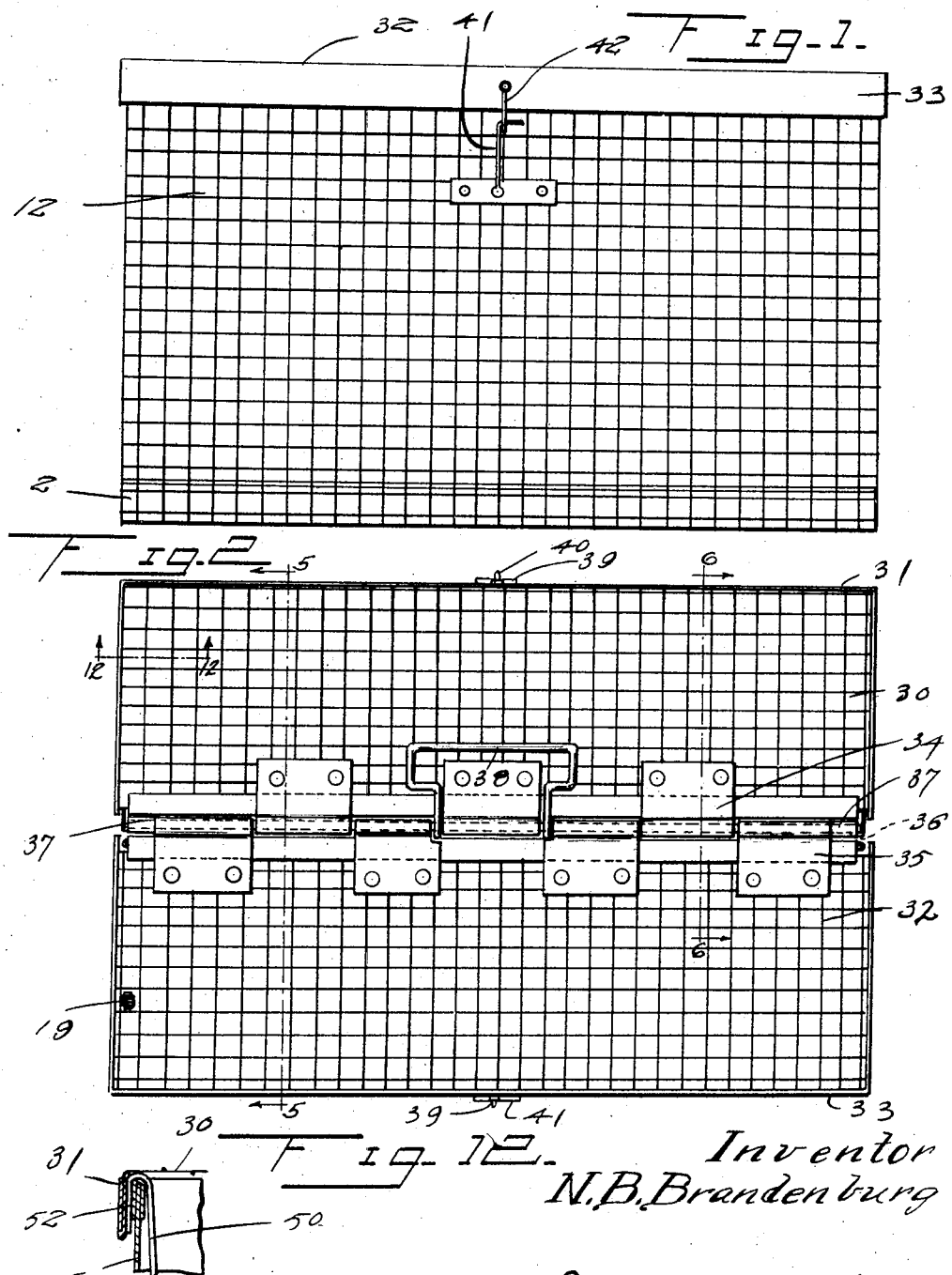

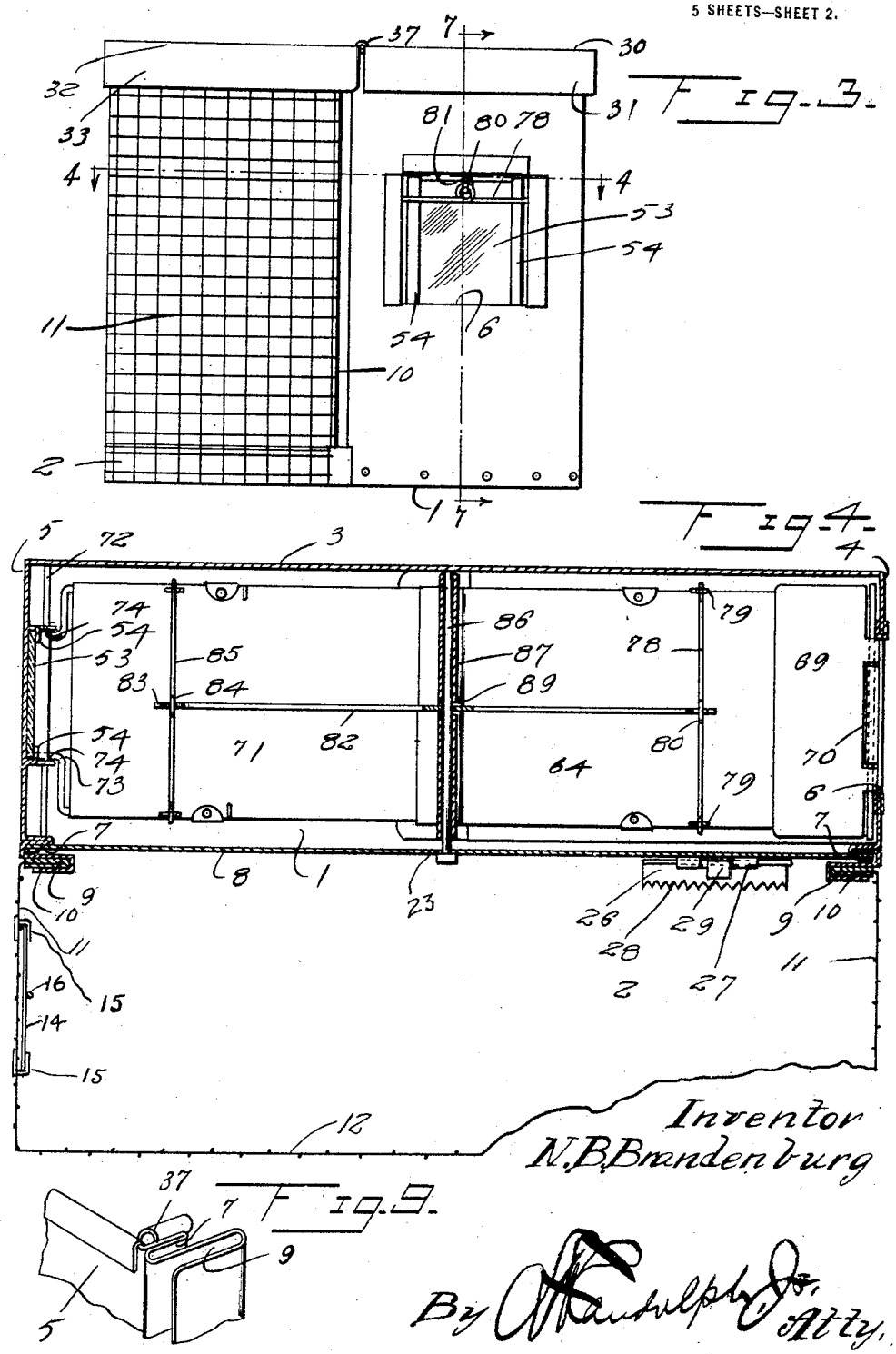

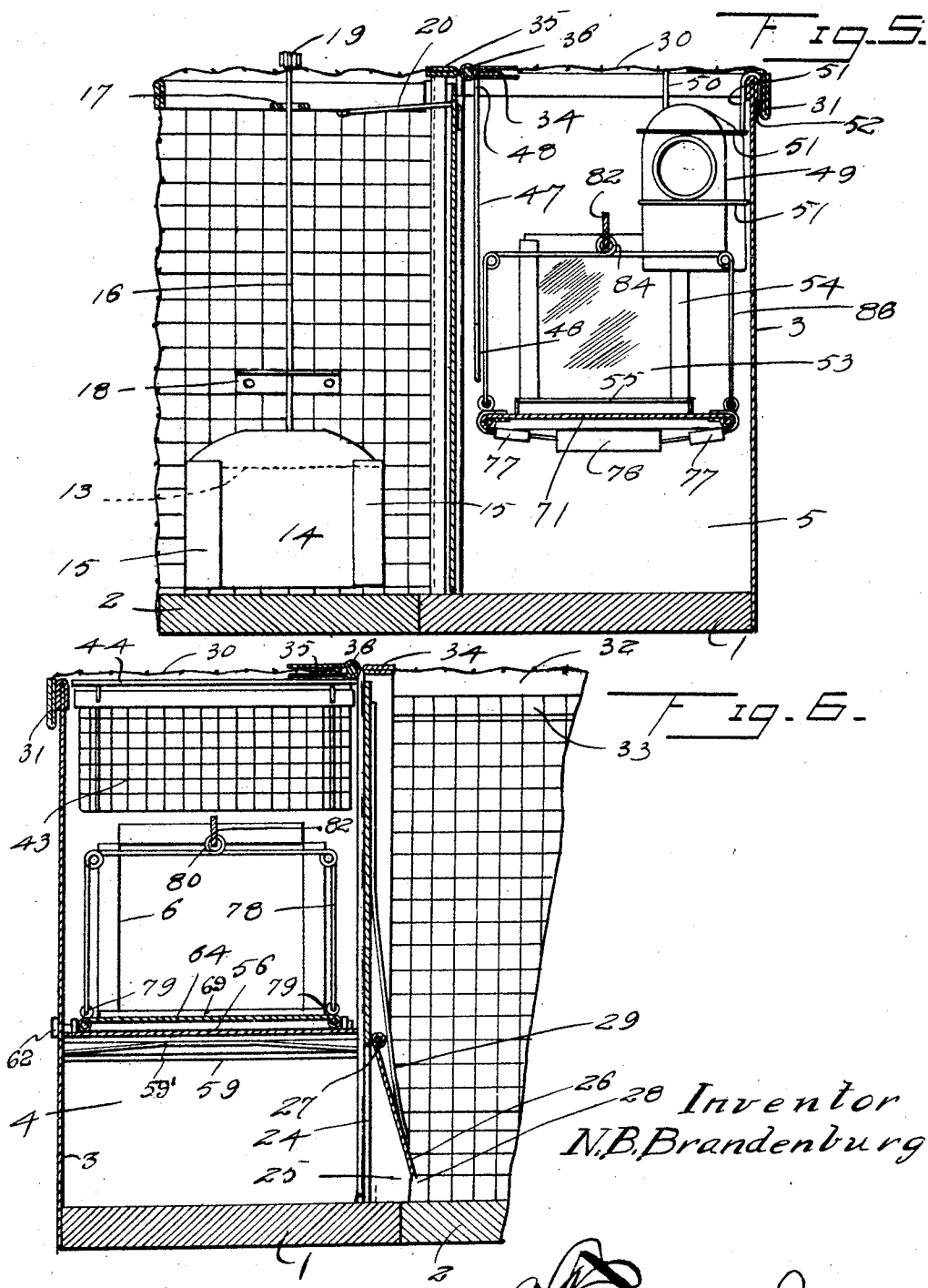

1,404,088.

Patented Jan. 17, 1922.
5 SHEETS—SHEET 4.

Inventor
N. B. Brandenburg

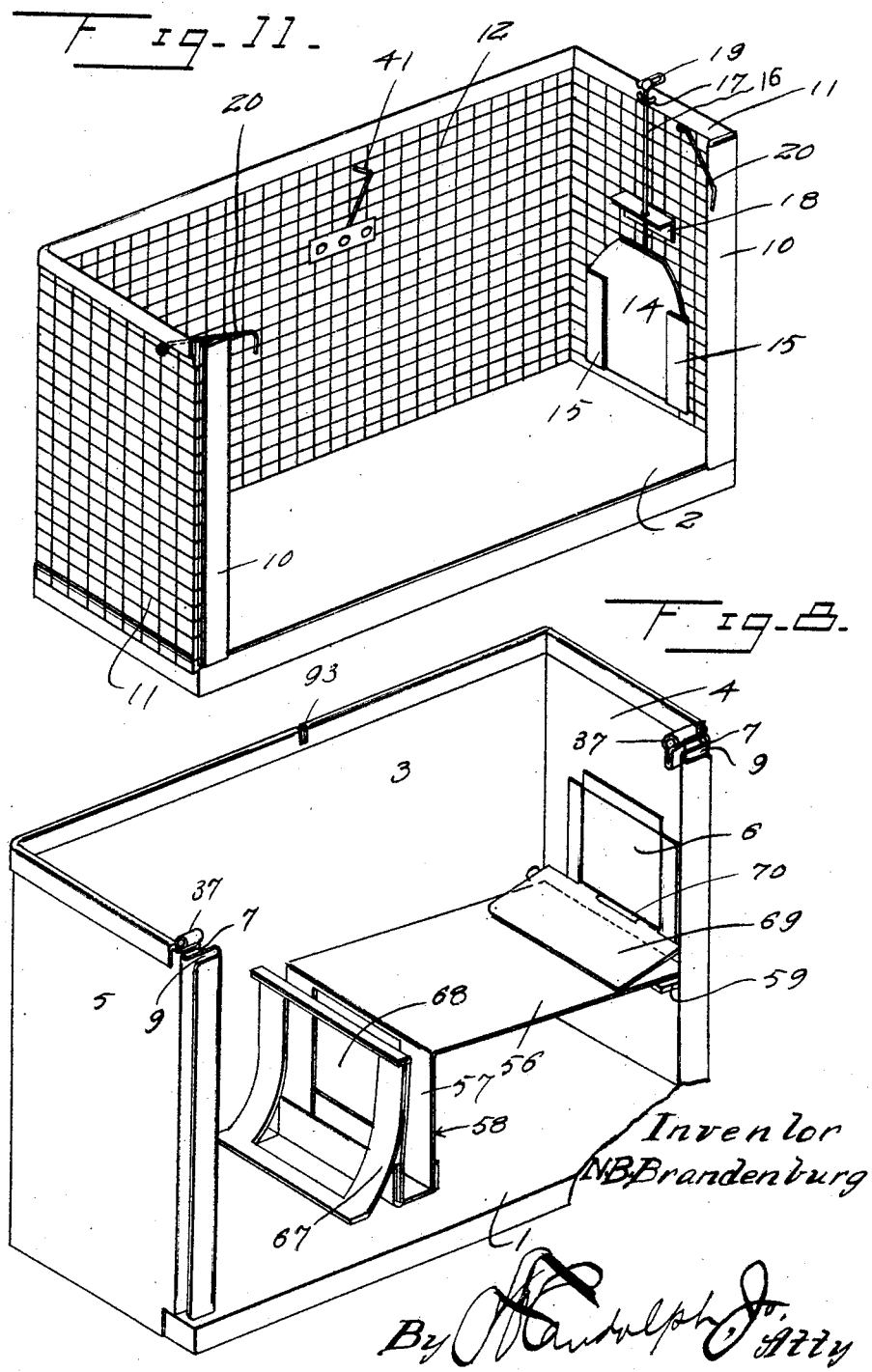

UNITED STATES PATENT OFFICE.

NAPOLEON B. BRANDENBURG, OF COLUMBUS, INDIANA.

RAT TRAP.

1,404,088.

Specification of Letters Patent.   Patented Jan. 17, 1922.

Application filed January 7, 1920. Serial No. 349,857.

*To all whom it may concern:*

Be it known that I, NAPOLEON B. BRANDENBURG, a citizen of the United States, residing at Columbus, in the county of Bartholomew and State of Indiana, have invented certain new and useful Improvements in Rat Traps; and I do hereby declare the following to be a full, clear, and exact description of the invention, such as will enable others skilled in the art to which it appertains to make and use the same.

This invention relates to certain new and useful improvements in rat traps and has for its primary object, the provision of a trap which will be of simple construction and operation as well as highly efficient in use and in which all the parts may be readily removed for cleaning.

Another object of the invention resides in the provision of a rat trap in which novel connecting and operating means may be provided for the drop and hoist pedals or plates hinged beneath the bait holders in the trap section, the connecting and operating means being supported by the outer door or wall of the trap section and the removable partition plate between the trap section and the cage section of the device.

A further object of the invention resides in the provision of a trap of the above stated character in which the drop door carried by the hoist pedal or plate and the false bottom beneath the hoist pedal or plate will effectively serve to close the rodent in the compartment of the trap section immediately upon its entry into this compartment from the drop pedal or plate and from which compartment the rodent may find its way beneath the spring pressed door into the cage section of the device.

The invention has for a still further object, the provision of a trap of the above stated character in which the operative parts may be readily mounted in the sections thereof and the sections and partition plate as well as the sectional cover, readily assembled when it is desired to use the trap.

Many other objects will appear as the description proceeds and it will be understood that the invention consists in the combination, arrangement and cooperation of the various parts thereof as hereinafter clearly set forth, claimed and illustrated in the accompanying drawings forming a part of the application and in which:—

Figure 1 is a side elevation of the trap, looking at the cage side thereof.

Figure 2 is a top plan view of the trap.

Figure 3 is an end elevation of the entrance end of the trap.

Figure 4 is a horizontal sectional view looking downwardly, said section being taken on the line 4—4 of Figure 3.

Figure 5 is a transverse vertical section, taken on the line 5—5 of Figure 2, looking in the direction indicated by the arrows.

Figure 6 is a transverse vertical section on the line 6—6 of Figure 2, looking in the direction indicated by the arrows.

Figure 8 is a perspective view of the trap section looking at the inner side thereof which connects with the cage section.

Figure 9 is an enlarged detail perspective of one hinge corner of the trap.

Figure 11 is a perspective view of the cage section, looking at the inner side thereof which connects with the trap section.

Figure 12 is a fragmentary detail section, taken on line 12—12 of Figure 2 and showing the manner of mounting the water container in the trap section.

Figure 7:
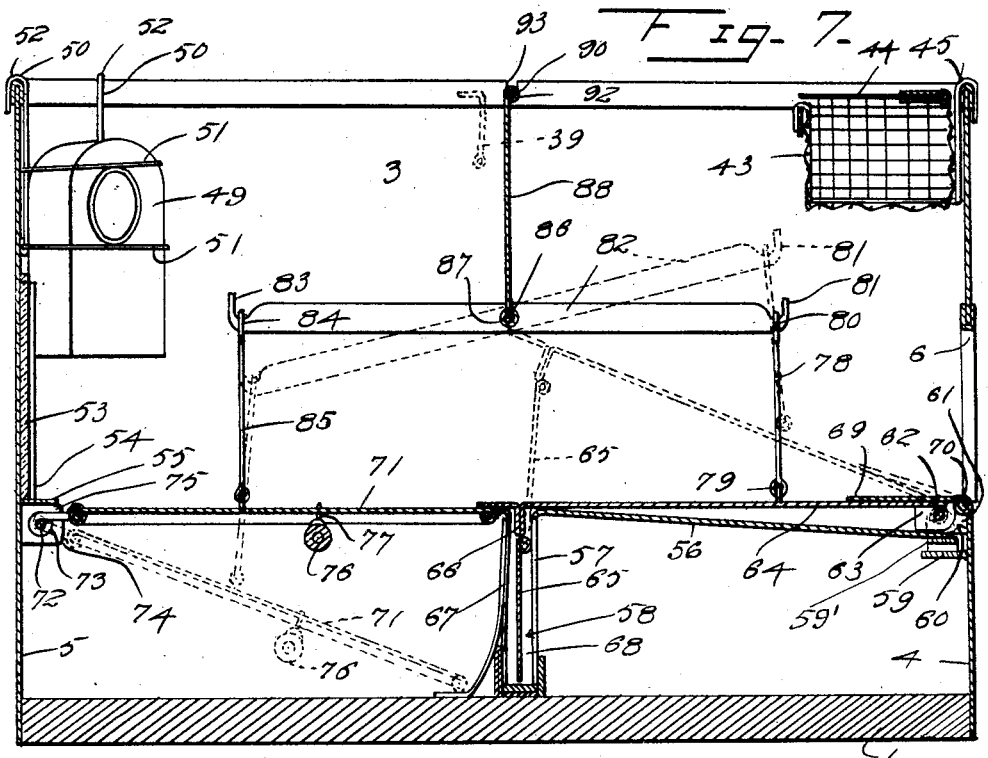
Figure 7 is a longitudinal vertical section through the trap section of the device, as indicated by the section lines 7—7 of Figure 3, showing the parts in operative position.
Figure 10:
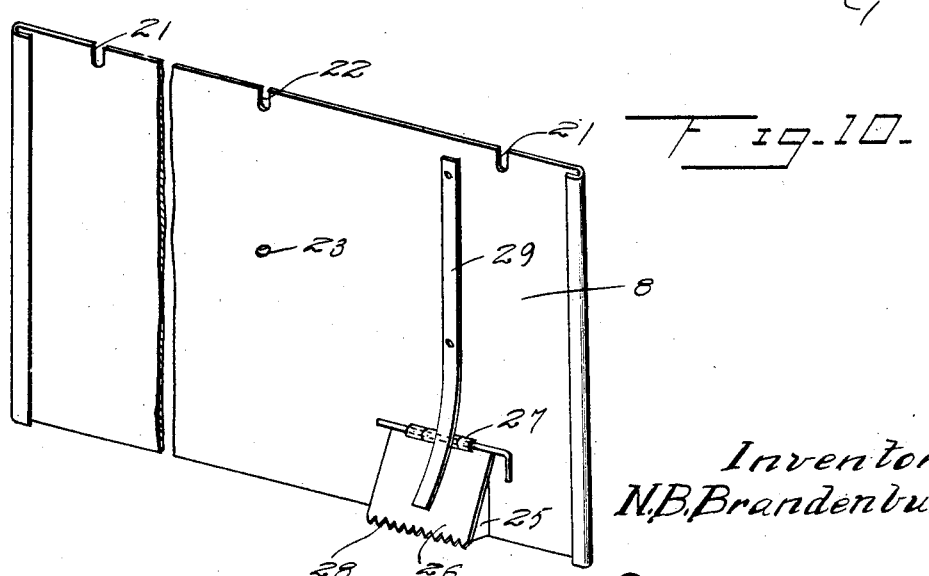
Figure 10 is a detail perspective view of the partition plate, removed.

Referring more in detail to the drawings, in which similar reference characters designate corresponding parts throughout the several views, 1 designates the floor of the trap section and 2 the floor of the cage section of the device. The body of the trap section is preferably constructed of metal, which is bent to form the outer side wall 3, the front end wall 4 and the rear end wall 5, the lower edge of all of the walls being secured to the side and end edge portions of the bottom 1, in any suitable and well known manner. The front end wall 4 is provided with a suitable opening to form the entrance doorway or entrance opening 6, as clearly shown in Figure 3 of the drawings. The end members 4 and 5 of the trap section body are extended at their inner vertical edges toward one another, then bent back and turned and again extended inwardly toward one another, to provide runways or channels 7 for the vertical ends or edge portions of the partition plate 8 between the trap section and the cage section and which also serves as the inner side of the trap section when in position. After forming the channels 7, the edges of the end members 4 and 5 are again turned and extended outwardly away from one another to form channels 9 for the inwardly directed inner vertical edges 10 of the end portions 11 of the cage section, which cage section also includes an outer side or front side 12. The cage section is preferably formed of strong wire mesh and is provided with an exit doorway or opening 13 in its rear end portion, which is normally closed by the sliding door 14 having its opposite side or vertical edges riding in channel guides 15 carried by the rear end portion along the opposite edges of the doorway or opening 13 and preferably upon the inner side of said rear end portion. The door 14 may be raised and lowered by the operating rod 16 secured in the upper edge thereof and working through guide members 17 and 18 mounted on the inner face of said rear end portion of the cage section. The rod 16 carries a suitable handle 19 upon its upper free end, by means of which the rod may be readily manipulated.

Outward spreading movement of the end portions 11 of the cage section is prevented by the hooks 20, carried by said end portions 11 and removably engaged in the notches 21 provided therefor in the upper edge of the partition plate 8. The hooks 20 also assist in holding the partition plate 8 in proper position.

The partition plate 8 is provided with a central notch or recess 22 and a pin receiving opening 23 beneath the notch 22, the purpose of which will presently appear. The partition plate 8 is further provided with an opening or doorway in its lower portion and adjacent its forward end, as designated by the numeral 24, the material along the vertical edges of the doorway 24 being directed outwardly in parallel relation into the cage section and bent back from one another to form inclined side flanges 25 against which normally rests the spring actuated door 26 hinged at its upper end above the doorway 24, as shown at 27 and provided with teeth 28 along its lower edge which are bent slightly, the toothed lower edge of the door 26 being spaced slightly above the floor 2 of the cage section. The door 26 is normally retained in its closed position by means of the leaf spring 29 mounted upon the partition plate 8 and having its free lower end pressing against the outer face of the door 26, as clearly shown in the drawings. It will therefore be seen that a rodent caught in the trap section may readily force its way under the door 26 and raise the latter against the action of the spring 29, the spring 29 and the teeth 28 of the door 26 cooperating to prevent the rodent from returning to the trap section and the door 26 automatically closing after the rodent has passed beneath the same into the cage section.

In order to effectively close the upper ends of the trap and cage sections, I have provided a two part open work cover which is preferably constructed of wire mesh with metallic or reinforced side and end portions extended downwardly for engagement along the sides and ends of the trap. The section of the cover for engagement over the trap section is designated by the numeral 30 and the depending edges thereof are indicated by the numeral 31, while the cover section for engagement over the cage section of the trap is designated by the numeral 32, the depending edges of this cover section being indicated by the numeral 33. The cover sections 30 and 32 have hinged members 34 and 35 respectively along their inner edges and through which the hinge rod 36 is extended to connect the cover sections. When the cage section and partition plate are removed from the trap section, the cover may be placed in position or removed by spreading the upper portions of the ends 4 and 5 of the trap body, which ends 4 and 5 carry socket bearings 37 for the ends of the hinge rod 36, it being understood that the hinge sections 30 and 32 must be swung upwardly during the operation of placing the cover upon the trap section or removing the cover therefrom. A handle 38 is also carried by the hinge rod 36, by means of which the trap may be readily transported from place to place when assembled. When all of the parts of the trap are properly assembled, the cover section 30 may be secured in closed position by means of the hook 39 carried by the trap section and adapted for engagement in the catch member 40 carried by the cover section 30. The cover section 32 may be secured in closed position over the cage section of the trap by means of a similar hook 41 carried by said cage section and adapted for engagement with the catch member 42 mounted on the cover section 32.

A bait containing basket 43 having a cover 44 is removably mounted in the front or entrance end of the trap section, above the entrance opening 6, by means of suitable supporting hooks 45 carried by the container for engagement over the upper edge of the front end 4 of the trap section. By placing the bait container in this position, the closed and locked cover section 30 will prevent the cover 44 of the bait container 43 from being raised by a rodent entering the trap. Additional bait may be secured upon the lower turned end 46 of the bait hook 47, the upper end 48 of the hook is turned back for engagement over the upper edge of the rear end 5 of the body of the trap section, while water may be supplied in the water vessel 49 suspended in one rear corner of the trap section by a pair of hook members 50 mounted thereon by the wires 51 encircling the water vessel 49 to clamp the hook supporting members 50 in engagement with opposite side of the vessel 49. The upper ends 52 of the hook supporting members 50 have their ends turned back for engagement over the upper edges of the outer side 3 and the rear end 5 of the trap section body, as clearly shown in the drawings. In order to cause a rodent approaching the trap to believe that other rodents are within the same, a mirror 53 is removably mounted in the supporting frame 54 secured to the inner face of the rear end 5 of the body to hold the mirror in position opposite the entrance opening 6 for the purpose of reflecting the image of the approaching rodent. The mirror supporting frame 54 includes a lower stop member 55 for limiting downward movement of the mirror 53 within the frame 54.

Within the trap section is secured a false bottom 56 which has its rear end connected with the front vertical plate 57 of the transverse central partition 58 secured upon the bottom 1 of the trap section, while the free forward end of the false bottom 56 rests between the supporting arch 59' mounted on the transverse strip or flange 59 secured there-beneath to the inner face of the trap section front 4, and the hinge member 60 also carried upon the inner face of the trap section front 4, above the free end of the false bottom 56. The hinge member 60 includes parallel ears 61 through which is engaged a hinge pin 62 which also extends through parallel ears 63 projecting from the forward end of the hoist pedal or plate 64 which normally rests upon the false bottom 56 and carries a drop door 65 which is hinged to a depending transverse flange 66 carried by the hoist pedal or plate 64, rearwardly of the false bottom 56, the drop door 65 extending between the front plate 57 and the rear plate 67 of the transverse partition 58, while the rear end of the hoist pedal or plate 64 extends over the rear plate 67 of the transverse partition 58, thereby preventing the drop door 65 from being interfered with. The front plate 57 and the rear plate 67 are provided with registering central openings forming a passage 68 through which the rodent may pass in entering the compartment beneath the false bottom 56, as will be later clearly understood. A cover plate 69 is hinged at the lower edge of the entrance opening 6, as shown at 70 and normally rests upon the forward end of the hoist pedal or plate 64 to cover and protect the hinge mechanism thereof. Cooperating with the hoist pedal or plate 64 is the drop pedal or plate 71, which is positioned in the rear portion of the trap section and mounted upon a removable pin 72 which extends through the parallel ears 73 projecting from the rear end of the drop pedal or plate 71 and through the ears 74 of the hinge members 75 mounted on the inner face of the rear end 5 of said trap section, beneath the mirror supporting frame 54. The trap pedal or plate 71 has the forward end thereof suspended above the floor 1 of the trap section and beneath the rear end of plate 64—when in normal position. It will be evident that the hoist pedal or plate 64 and drop door 65 have a combined weight greater than the weight of the drop pedal or plate 71 and therefore the weight member 76 is mounted thereon in a suitable manner, as shown at 77 to increase the weight of the latter, the object of which will later appear. A substantially U-shaped member 78 is secured in inverted position to the sides of the hoist pedal or plate 64, forwardly of the longitudinal centre thereof, as shown at 79, while the eye 80 is formed at the centre of the member 78, above the hoist pedal or plate 64, for removable engagement by the hook 81 on the forward end of the rock arm 82, which carries a similar hook 83 at its opposite or rear end for removable engagement with the eye 84 formed centrally of the U-shaped member 85 which is inverted and secured by its spaced leg portions to the sides of the drop pedal or plate 71, rearwardly of the longitudinal centre thereof. The rock arm 82 is pivoted centrally upon the supporting pin 86, which is engaged through the opening 23 in the partition plate 8 and through the turned back lower edge 87 of the supporting plate 88, a central recess 89 being provided in the turned back lower edge 87 to accommodate the rock arm 82. The suspending rod 90, extended through the rolled upper edge of the supporting plate 88 has its extended ends turned right angled from its main portion, as shown at 92, one end of the rod 90 resting in the notch 22 in the upper edge of the partition plate 8 while the opposite end of the rod 90 rests in a corresponding notch 93 in the central portion of the outer side 3 of the trap section and along the upper edge thereof. Hinged pins 62 and 72 may be readily removed from the outer side of the trap section, as will be readily understood.

From the foregoing description, taken in connection with the accompanying drawings it will be evident that all of the operative parts, and bait holders may be readily removed from the trap section and the other parts disconnected for the purpose of cleaning the trap, storing away the trap or transporting the same.

When the parts of the trap are assembled for use, the rodent entering the same by way of the entrance opening 6 and passing from the hoist pedal or plate 64 on to the drop pedal or plate 71 in an effort to reach the bait upon the bait hook 47 or the water within the water receptacle 49, will cause operation of the drop pedal or plate 71 and hoist pedal or plate 64 in opposite directions, carrying the rodent downwardly in the rear portion of the trap section to a position opposite the passage 68 with the drop door 65 raised, whereby the rodent may pass through the passage 68 into the compartment beneath the false bottom 56, immediately after which the drop pedal or plate 71 and hoist pedal or plate 64, together with the operative parts connected therewith will return automatically to normal position, closing the rodent in the compartment beneath the false bottom 56 and resetting the trap for the next victim. After the rodent has been closed in the compartment beneath the false bottom 56 it may force its way under the spring pressed door 26 to enter the cage section of the trap, where it will be prevented from returning to the trap section of the device and may be removed by way of the exit opening 13 at the pleasure of the operator or attendant.

When it is desired to take apart the trap, the hook 41 is released, the cover section 32 swung backwardly, the hooks 20 withdrawn from the notches 21, the supporting pin 86 withdrawn from the supporting plate 88 and the partition plate 8, and the end of the supporting rod 90 disengaged from the central notch or recess 22 of the partition plate 8. The partition plate 8 may then be raised upwardly and completely withdrawn from between the trap and cage sections, the cage section removed, the ends of the trap section sprung outwardly to remove the sectional cover, and all of the operative parts within the trap section disconnected and withdrawn therefrom. The bait supporting members may also be readily removed from the trap section and the complete device cleaned and reassembled. It will be evident in reassembling the parts, the operation or order of assembling them must be reversed. While the preferred embodiment of the invention has been illustrated and described, it will be understood that many minor changes in the details of construction and arrangement of parts may be resorted to within the scope of the appended claims without departing from the spirit of the invention.

What is claimed is:—

1. A trap comprising a trap section, a cage section removably connected with said trap section, a partition plate removably mounted between said sections, operative mechanism within said trap section for directing a victim within the trap section into a closed compartment therein, and means for supporting said operative mechanism upon the walls of said trap section and said partition plate, said partition plate having a passage formed therein to provide communication between such closed compartment and said cage section.

2. A trap comprising a trap section, a cage section supported thereby, a removable partition plate between said sections, said trap section having an entrance opening, a hinged member adjacent said entrance opening, a second hinged member connected with the first mentioned hinged member and adapted to direct a victim positioned thereon to a compartment beneath the first mentioned hinged member, means carried by said first mentioned hinged member to close said compartment when said first mentioned hinged member is in normal position, said partition plate having a door opening forming communications between said compartment of the trap section and the cage section, a door for normally closing said door opening, and a cover for said sections.

3. A trap comprising a trap section, a cage section detachably connected therewith, a partition plate positioned between said trap section and said cage section, a hinged member within said trap section, a second hinged member in said trap section, means for connecting said hinged members, a false bottom beneath one of said hinged members to form the upper wall of a compartment in said trap section, a drop door carried by the last mentioned hinged member to close said compartment when said hinged member is in its lowermost position, said drop door being adapted to be raised to open said compartment for a victim leaving the first mentioned hinged member and passing on to the other hinged member to force the same downwardly and raise the first mentioned hinged member, a normally closed door carried by said partition plate to permit the victim to pass from the compartment of the trap section into the cage section, a cover for said sections, and means within said trap section for attracting victims to the interior thereof.

4. A trap comprising a trap section, a cage section mounted on said trap section, a partition plate between said sections, said trap section having an entrance opening, image reflecting means opposite said entrance opening and within said trap section, bait carrying means within said trap section, oppositely swinging platforms within said trap section, one of said platforms being mounted over a victim receiving compartment, a door carried by said platform to normally close said compartment, means for guiding said door when being raised and lowered and preventing the victim from opening the door after being caught in the compartment, balancing and connecting means between said platforms, supporting means for the last mentioned means carried by one wall of the trap compartment and said partition plate, and covering means for said sections, said partition plate having a normally closed connecting door between the compartment of the trap section and the cage section.

5. A trap comprising a trap section having an entrance opening, a platform hinged beneath said entrance opening and within said trap section, a false bottom beneath said platform and forming a victim receiving compartment, a drop platform hinged in the opposite end of said trap section and extended toward the first mentioned platform, said first mentioned platform normally resting upon said false bottom, a drop door depending from the free end of said first mentioned platform to normally close said compartment, a guide frame for said drop door and surrounding and protecting the same in closed position, said drop platform being adapted to be swung downwardly by the weight of the victim passing on to the same from the first mentioned platform, whereby the drop door will be raised to permit the victim to enter the victim receiving compartment and be closed therein by dropping of the first mentioned platform and the drop door carried thereby, connections between said platforms, supporting means for said connections, a cage section mounted on said trap section, and a partition plate between said sections, said supporting means being carried by said partition plate and the opposite wall of said trap section, said trap section having a door through which the victim may pass into the cage section.

6. A trap comprising a trap section having an entrance opening, a pair of platforms hinged in said trap section at points below the plane of the entrance opening thereof, said platforms having their free ends extended toward one another, one of said platforms being normally in suspended position, a victim receiving compartment beneath the remaining platform, said remaining platform normally resting upon said victim receiving compartment, a rock arm extended longitudinally above said platforms, connecting members pivoted upon the ends of said rock arm and having forked portions connected with said platforms, a drop door carried by the said remaining platform to normally close the victim receiving compartment, said drop door being raised with the said remaining platform, guide means for said drop door, removable hinge mountings for said platforms, a cage section opposite said trap section, a partition member between said sections, supporting means for the rock arm being mounted on said partition plate and one wall of said trap section, and communicating door carried by said partition member and adapted to be forced open into the cage section by the victim passing thereinto from the compartment of the trap section, said cage section having an exit opening through which the victim may be removed, a door closing said exit opening, and a sectional cover for said trap, one section of the cover serving to close each section of the trap.

7. A trap comprising a trap section, a cage section removably mounted on said trap section, a partition plate removably mounted on said trap section to close the latter from said cage section, said partition plate having a communicating door opening for said trap section and said cage section, a normally closed door engaged against said door opening, a sectional cover removably mounted on said trap section, said trap section having a victim receiving compartment formed therein, operative members within said trap section to direct a victim to said compartment, removable mounting means for said operative members, said supporting means being removably mounted on said partition plate and one wall of said trap section, and removable bait supporting members mounted in said trap section.

8. A trap comprising separate trap and cage sections, means carried by said trap section and said cage sections for interlocking engagement, said trap section having an entrance, means within said trap section for trapping a victim entering the same, and a partition removably mounted in the interlocking means between said trap section and said cage section with a communicating and normally closed opening in said partition.

9. A trap comprising a trap section of rectangular form and including a bottom member, a cage section of rectangular form and including a bottom member, each of said sections including an open side, interlocking flanges carried by the said sections at their open sides, the flanges of one of said sections serving as a guide, a partition removably positioned in said guide formed by the flanges, a normally closed door carried by said partition to form communication between said sections, said door adapted to be opened by the victim passing into the cage section, said trap section having an entrance opening, pivoted trapping members mounted in said trap section to direct a victim entering the trap section to the cage section, and supporting means for the trapping means.

10. A trap comprising a trap section and a cage section adapted to be interlocked with one another, a removable partition member positioned between said sections and having an opening formed therein, a spring door for normally closing said opening, said trap section having a compartment opposite the door opening of the partition, said trap section having an entrance opening for a victim, and means within said trap section for directing a victim entering the same to the compartment opposite the door of the partition.

11. A trap comprising a trap section and a cage section adapted to be interlocked with one another, a removable partition member positioned between said sections and having an opening formed therein, a spring door for normally closing said opening, said trap section having a compartment opposite the door opening of the partition, said trap section having an entrance opening for a victim, means within said trap section for directing a victim entering the same to the compartment opposite the door of the partition, and means for preventing a victim from escaping from the compartment in the trap section except by way of the door opening leading to the cage section.

12. A trap comprising a trap section and a cage section adapted to be interlocked with one another, a removable partition member positioned between said sections and having an opening formed therein, a spring door for normally closing said opening, said trap section having a compartment opposite the door opening of the partition, said trap section having an entrance opening for a victim, means within said trap section for directing a victim entering the same to the compartment opposite the door of the partition, means for preventing a victim from escaping from the compartment in the trap section except by way of the door opening leading to the cage section, and hinged cover members for each of said sections of the trap, one of said trap sections being provided with hinged means for the cover members.

In testimony whereof I affix my signature in presence of two witnesses.

NAPOLEON B. BRANDENBURG.

Witnesses:
    LEE RILY BURGESS,
    ETHEL IRENE HOFFMAN.